Patented June 25, 1946

2,402,792

UNITED STATES PATENT OFFICE 2,402,792

VISCOUS MINERAL OIL COMPOSITIONS

Roger W. Watson, Chicago, Ill., and James W. Gaynor, Hammond, Ind., assignors to Standard Oil Company, Chicago, Ill., a corporation of Indiana No Drawing. Application October 23, 1944, Serial No. 560,050

7 Claims. (Cl. 252—51.5)

This invention relates to hydrocarbon oil compositions and particularly to hydrocarbon oil compositions inhibited against the deleterious effects of metal catalysts, particularly iron. The invention is more particularly related to the stabilization of viscous mineral oils such as turbine oils, transformer oils and internal combustion engine lubricants by the use of certain types of additives which effectively inhibit the deleterious oxidation of such oils, especially in the presence of metal catalysts such as iron.

Hydrocarbon oils such as petroleum oils which have been subjected to relatively drastic chemical treatment such as by sulfuric acid treatment and/or extraction with selective solvents such as, for example, phenol, furfural, Chlorex and the like, are susceptible to oxidative deterioration during use and/or storage, particularly when such oils are used or stored in the presence of metal salts such as iron which accelerates the oxidation of such oils. Such oxidative deterioration results in the formation of acidic bodies and/or sludge-forming bodies and/or color-forming bodies which obviously are highly undesirable.

An object of the present invention is to provide a hydrocarbon oil composition which is resistant to oxidative deterioration, particularly in the presence of metal catalysts such as iron. Another object of the present invention is to provide a hydrocarbon oil composition inhibited against the formation of acidic bodies and/or color-forming bodies and/or sludge-forming bodies during use or storage, particularly in the presence of metal catalysts which accelerate the oxidative deterioration of such oils. Another object of the invention is to provide a method of inhibiting the oxidative deterioration of hydrocarbon oils which are normally susceptible to such deterioration, particularly in the presence of oxidation accelerating metal catalysts.

We have discovered that refined hydrocarbon oils, for example mineral oils, can be substantially inhibited against oxidative deterioration in the presence of metal catalysts by incorporating in such oils acyl substituted arylene diamines preferably acyl substituted phenylene diamine. It has been found that from about 0.001% to about 0.5% and preferably from about 0.01% to about 0.2% of these addition agents is refined hydrocarbon oils which are susceptible to oxidative deterioration, particularly in the presence of metal catalysts such as iron, effectively inhibit such oxidative deterioration. Compounds which are suitable for the present invention have the general formula

in which X is an arylene radical, R is an acyl radical and R' is hydrogen or an aliphatic, aralkyl, cyclo-aliphatic or an acyl radical. Compounds of the preferred class have the general formula

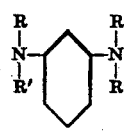

in which R is an acyl radical, and R' is either hydrogen, an aliphatic, aralkyl, cyclo-aliphatic or an acyl radical. This general class of compounds includes the acyl-substituted meta-, ortho- and paraphenylene diamines.

The following are illustrative of the specific types of compounds which fall within the above general class of compounds suitable for the herein-described use:

Para-amino-acetanilide
4-amino-methyl-acetanilide
Meta-amino-acetanilide
3-diethyl-amino-acetanilide
Amino-benzoyl-phenylene diamine
4-amino-hexyl-benzoyl-phenylene diamine
3-dibutyl-amino-benzoyl-phenylene diamine
4-dioctyl-amino-methyl-benzoyl-phenylene diamine
3-dilauryl-amino-ethyl-acetanilide
2-butyl-amino-butyl-acetanilide
Para-amino-propion anilide
N-methyl-N'-stearyl-phenylene diamine
N-naphthenyl (from naphthenic acids)-paraphenylene diamine
N-acetyl-N'-benzoyl-para-phenylene diamine
N,N'-diacetyl-meta-phenylene diamine
N,N'-trimethyl-acetyl-para-phenylene diamine
N,N'-dipropionyl-toluylene diamine
N-benzoyl-naphthylene diamine
N-dimethyl-N'-acetyl-toluylene diamine
N-methyl-benzoyl-N'-dibutyl-naphthylene diamine While compounds of the herein-described class are effective in inhibiting the oxidative deterioration of hydrocarbon oils in the presence of metal catalysts, particularly iron, it is not to be implied that all are equally effective since the effectiveness can vary with the type of oil and the conditions of use.

type of viscous hydrocarbon oil, for example mineral oil, we prefer to employ hydrocarbon oils which are substantially free of wax or waxy substances which tend to increase the pour point of such oils. By "viscous" hydrocarbon oil we mean an oil having a Saybolt Universal viscosity at 100° F. of at least about 60–70 seconds.

The effectiveness of the herein-described compounds in inhibiting the oxidative deterioration of hydrocarbon oils in the presence of a metal catalyst such as iron can be determined by the following test:

Ten grams of the oil to be tested containing 0.1 gram of finely ground iron catalyst is placed in a container having a tapered ground glass joint into which is fitted a gas bubbling tube having a ground glass joint which fits into the ground joint of the container. Oxygen is then bubbled through the oil at a rate of 1 liter of gas per hour for a period of 24 hours at a temperature of 320° F. At the end of this period the oil is removed and color, acidity and sludge determinations are made. The effectiveness of the class of arylene diamines disclosed herein in inhibiting the deleterious effect of metal catalysts, particularly iron, on hydrocarbon oil is shown by the following data obtained in the foregoing test:

| Oil | Catalyst | Color NPA | Acidity, mg. KOH/gm. oil | Sludge |
|---|---|---|---|---|
| A. Control (M. C. SAE 20 base stock). | 0.1 g. powdered Fe. | Black. | 11.8 | + |
| B. Control +0.1% 4-amino-methyl-acetanilide. | ...do... | 5. | 0.40 | 0 |
| C. Control +0.1% para-amino-acetanilide. | ...do... | Light. | 0.30 | + |
| D. Control +0.1% meta-amino-acetanilide. | ...do... | 4. | 0.17 | 0 |
| E. Control +0.1% 3-diethylamino-acetanilide. | ...do... | Light. | 0.2 | 0 |

In the above table the notation "+" in the column headed "sludge" denotes that sludge was present in the oil while the notation of "0" denotes that no sludge was present in the oil.

It is evident from the above data that the acyl-substituted arylene diamines effectively inhibit the oxidative deterioration of hydrocarbon oils in the presence of metal catalysts.

While we have described our invention by reference to certain specific embodiments thereof, and by certain specific examples, we do not intend to limit the invention to these specific embodiments and examples except in so far as the same are defined by the following claims.

We claim:

1. A stable viscous substantially wax-free hydrocarbon oil comprising a hydrocarbon oil normally susceptible to oxidative deterioration and a phenylene diamine having the general formula

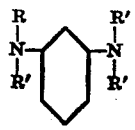

in which R is an acyl radical and R' is a substituent selected from the class consisting of hydrogen, aliphatic, cyclo-aliphatic, aralkyl, and acyl radicals, said phenylene diamine being used in small but sufficient quantities to inhibit the oxidative deterioration of said oil.

2. A stable viscous substantially wax-free hydrocarbon oil composition comprising a viscous hydrocarbon oil normally susceptible to oxidative deterioration in the presence of iron and a phenylene diamine compound having the general formula

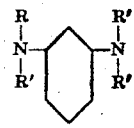

in which R is an acyl radical and R' is a substituent selected from the class consisting of hydrogen, aliphatic, cyclo-aliphatic, aralkyl and acyl radicals, said phenylene diamine being used in small but sufficient quantities to inhibit the oxidative deterioration of said oil.

3. A stable viscous mineral oil composition comprising a viscous substantially wax-free mineral oil normally susceptible to oxidative deterioration in the presence of metal and from about 0.001% to about 0.5% of an acyl substituted phenylene diamine.

4. A stable viscous mineral oil composition comprising a viscous substantially wax-free mineral oil normally susceptible to oxidative deterioration in the presence of metal and from about 0.001% to about 0.5% of a 4-aminomethyl-acetanilide.

5. A stable viscous mineral oil composition comprising a viscous substantially wax-free mineral oil normally susceptible to oxidative deterioration in the presence of metal and from about 0.001% to about 0.5% of an amino-acetanilide.

6. A stable viscous mineral oil composition comprising a viscous substantially wax-free mineral oil normally susceptible to oxidative deterioration in the presence of metal and from about 0.001% to about 0.5% of 3-diethyl-amino-acetanilide.

7. A stable viscous substantially wax-free hydrocarbon oil comprising a hydrocarbon oil normally susceptible to oxidative deterioration and an acyl substituted arylene diamine having the general formula

in which X is an arylene radical, R is an acyl radical and R' is a substituent selected from the class consisting of hydrogen, an aliphatic radical, an aralkyl radical, a cyclo-aliphatic radical and an acyl radical, said acyl substituted arylene diamine being added in small but sufficient quantities to inhibit the oxidative deterioration of said oil.

ROGER W. WATSON.
JAMES W. GAYNOR.

Certificate of Correction

Patent No. 2,402,792.  June 25, 1946.

ROGER W. WATSON ET AL.

It is hereby certified that errors appear in the printed specification of the above numbered patent requiring correction as follows: Column 2, lines 10 to 14, column 3, lines 64 to 68, claim 1, and column 4, lines 13 to 18, claim 2, strike out the formula in each instance and insert instead the following—

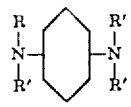

and that the said Letters Patent should be read with these corrections therein that the same may conform to the record of the case in the Patent Office.

Signed and sealed this 15th day of October, A. D. 1946.

[SEAL]

LESLIE FRAZER,
*First Assistant Commissioner of Patents.*